United States Patent [19]

Bos

[11] 4,210,263

[45] Jul. 1, 1980

[54] VALVE FOR BATCHWISE WITHDRAWING LIQUID FROM A CONTAINER

[76] Inventor: Willem Bos, Berkenweg 18, Zuidlaren, Netherlands

[21] Appl. No.: 915,155

[22] Filed: Jun. 13, 1978

[30] Foreign Application Priority Data

Jun. 14, 1977 [NL] Netherlands ............... 7706535

[51] Int. Cl.² .............................................. G01F 11/38
[52] U.S. Cl. .................................... 222/449; 222/453; 222/501
[58] Field of Search ................. 222/449, 453, 501

[56] References Cited

U.S. PATENT DOCUMENTS

| | | | |
|---|---|---|---|
| 1,062,576 | 5/1913 | Baskett et al. | 222/453 X |
| 2,216,347 | 10/1940 | Humbard | 222/453 X |
| 2,858,052 | 10/1958 | Costakos | 222/453 X |
| 3,288,332 | 11/1966 | Etter et al. | 222/80 |

Primary Examiner—F. J. Bartuska
Attorney, Agent, or Firm—Irvin A. Lavine

[57] ABSTRACT

A valve for batchwise discharging a liquid material from a container having an aperture for the passage of the material. The valve comprises a valve unit (3) which is an assembly of a valve stem 4 having two spaced collars functioning as valves. The collars are fixedly connected to the valve stem at right angles thereto. The valve stem is supported and guided at points on opposite sides of the valve area, ensuring proper centering during movement of the valve stem.

5 Claims, 2 Drawing Figures

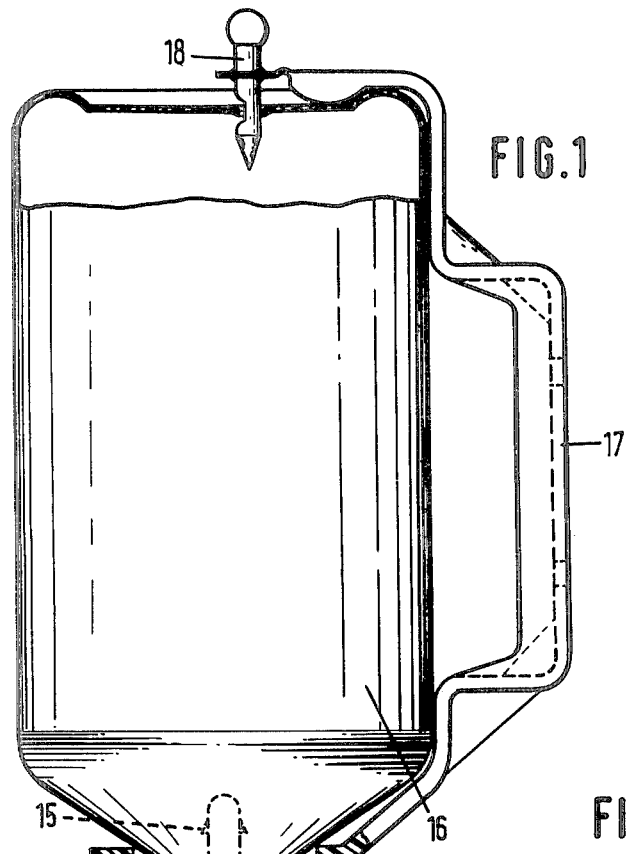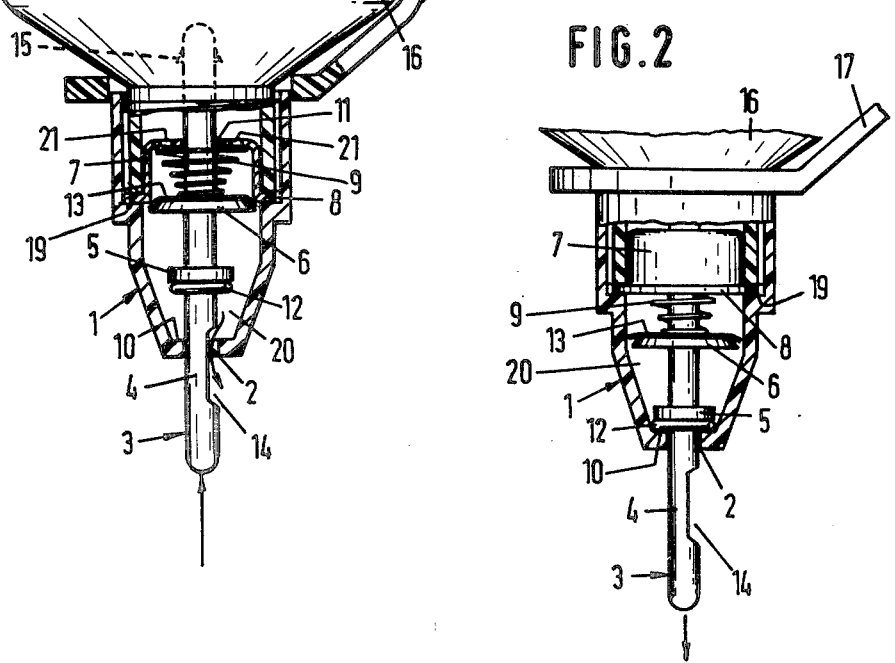

VALVE FOR BATCHWISE WITHDRAWING LIQUID FROM A CONTAINER

This invention relates to a valve for batchwise discharging a liquid material from a container having an aperture for the passage of said material, in particular a bottle.

In practice there is a wish for the possibility of withdrawing dosed quantities of a given liquid material from a container, for example a bottle, in which the material is stored. One example of such a practical case concerns containers filled with liquid soap in public lavatories. Another example concerns containers filled with liquid shampoo. This example, in particular, clearly illustrates the advantage of having a container with the possibility of applying pre-determined equal doses of shampoo at points spaced over the scalp.

It is an object of the present invention to provide means for realizing the wish described in the preceding paragraph. In addition, there is the condition that the liquid material should only be discharged from the container at command, and that, beyond that, therefore, there should not be any loss of material from leakage.

According to the present invention, there is provided a valve for batchwise discharging a liquid material from a container having an aperture for the discharge of said material, in particular a bottle, comprising a cap having an axial outlet, and a valve unit comprising a valve stem with a pair of spaced collars fixedly connected to said stem at right angles thereto and functioning as valves, and both located between said axial outlet and a guide member accessible for the passage of the liquid material, said guide member having a guide aperture for guiding the movement of said valve stem and a flange suitable for use as a valve seat, and being adapted to be lowered into the container aperture for the discharge of the material therein with said flange acting as a stop, and a spring supported on said guide member and confined between said guide member and the adjacent collar on said valve stem, which collar can provide a seal against the flange of said guide member and the other of which collars can provide a seal against the rim of said axial outlet.

The valve unit according to the present invention can be regarded as a double valve with the understanding that the two collars functioning as valves are fixedly connected to the valve stem. As the places where the valve stem is supported and guided against lateral movement during the opening and closing of the regulator have been selected on opposite sides of the area of the valves, proper centering of the valve stem movement is permanently ensured, so that the valves will be properly seated on the seats, too.

A preferred embodiment of the invention will now be described, by way of example, with reference to the accompanying drawings. In said drawings, FIG. 1 shows a part-sectional elevation of the valve according to the present invention, mounted on a bottle which in the condition shown is secured upside down for example to a wall by means of a bracket, the valve being in a position in which the connection to the bottle is closed and the connection to the outside is open; and FIG. 2 shows the valve of FIG. 1, also in section, in a position in which the connection to the bottle is open and that to the outside is closed.

Referring to the drawings, there is shown a bottle 16, filled for example with liquid soap, and suspended upside down from a bracket 17 secured to a wall (not shown) with adhesive or by means of screws.

The neck of the bottle has external screwthread on which the valve according to he present invention is screwed. The valve comprises a cap 1 having internal screwthread for it to be secured to the neck of the bottle 16. As its bottom, in the condition shown, cap 1 has an outlet 2. Designated by 3 is a valve unit comprising a valve stem 4, collars 5 and 6, guide member 7 and compression spring 9. When the valve unit is made from a synthetic plastics material, the generally better flexibility of such a material can be utilized to advantage for manufacturing the unit as a sub-assembly by providing valve stem 4 with a number of barbs 15, and sliding first spring 9 and then guide member 7 over them, the barbs preventing member 7 from sliding off stem 4. This procedure facilitates the subsequent installation of the combination on a bottle.

As shown, when valve unit 3 is installed, guide member 7 is lowered into the opening of the bottle neck. In this connection the diameter of member 7 is to be so selected as to avoid undue radial clearance between the inner wall of the bottle neck and the outer wall of the guide member. Guide member 7 is lowered into the bottle until flange 8 of guide member 7 abuts against the rim of the bottle neck. The inner wall of cap 1 is off-set to form a clamping edge 19, which when cap 1 is screwed home on to the bottle neck clamps down guide member 7 via flange 8 on the rim of container 16. Outlet 2 in the cap and the aperture 11 in guide member 7 each have a diameter matching the external diameter of stem 4, the latter being preferably constant throughout its length, so as to provide a good sliding fit for supporting and guiding the valve stem during its axial movements.

FIG. 1 shows valve stem 4 pushed upwardly against the action of spring 9 through a distance sufficient for collar 6 to be sealingly pressed mainly against the inner rim of flange 8. Preferably a sealing ring 13 of flexible material, for example, rubber, is provided on the sealing side of collar 6. By virtue of such a sealing ring, no leakage results from minor dimensional imperfections between the inner rim of the flange and collar 6, which in the case of synthetic plastics material can easily arise during the manufacturing process or when the cap is screwed on the bottle neck. The liquid soap presents in the cap cavity can flow away to the outside via the slit at the recess 14 formed in the valve stem.

When the pressure on the end of the valve stem is released, spring 9 will expand and force away the stem until sealing ring 12, of a flexible material such as rubber, abuts against bottom 10 of cap 1. Botton 10 is preferably made flat to provide for a contacting surface area as large as possible to promote due sealing. Collar 6 is cleared from the rim of flange 8, so that a fresh quantity of soap can flow from bottle 16 into the cap through perforations 21 formed in the recessed portion of guide member 7. Pressure equalization, required for the influx of soap into the cap, is ensured by means of an aperture made in the bottom of the bottle by pin member 18.

Naturally, variations and modifications of the embodiment of the invention as described and shown therein can be made without departing from the scope of the invention.

I claim:

1. A container having an axial opening in the lower part thereof, and a valve for discharging liquid therefrom comprising:

a cap having an axial outlet at the lower part thereof, an axially movable valve unit comprising a valve stem and a pair of spaced, outwardly extending collars on said valve stem, a guide member having an axial portion in and in engagement with the axial opening of the container and a portion transverse to said valve stem, a central aperture and a perforation in said transverse portion, means for securing said cap and guide member to said container comprising a rim on said container, a flange on said guide member abutting said rim, and a clamping edge on said cap engaging said guide member flange between said clamping edge and said rim, said valve stem passing through said central aperture and through said outlet in said cap, the diameter of said valve stem matching the diameter of the central aperture and said outlet to provide a sliding fit between said valve stem and the guide and cap during axial movement of the valve stem, said flange on said guide member providing a valve seat for engagement by the upper collar of said valve stem, means on the interior of said cap surrounding said outlet providing a valve seat for engagement by the lower collar of said valve stem, said valve stem having an axially extending recess therein in juxtaposition with said outlet of said cap, the axial distance between said collars being less than the axial distance between said valve seat means, and means for urging said valve stem downwardly to seat said lower collar against said valve seat means on said cap.

2. The combination of claim 1, and flexible sealing rings on the sealing sides of said collars for engaging said valve seat means.

3. The combination of claim 1, wherein said means for securing said caps on said container comprises external screwthreads on said container 4. The combination of claim 1, the aperture and outlet having the same diameter.

5. A container having a neck with an axial opening therethrough in the lower part thereof, and a valve for discharging liquid therefrom, said container neck having a lower rim, and having screwthreads thereon, a guide member having a cylindrical portion in and in engagement with the interior of said neck, a transverse portion within said neck, and an outwardly extending flange in engagement with said rim, said transverse portion having a central aperture and a perforation, a cap screwthreaded on said neck and having means thereon for clamping the outer portion of said flange against said rim, said cap having a lower outlet in alignment with said central aperture, an axially movable valve unit comprising a valve stem and a pair of spaced, outwardly extending upper and lower collars thereon, said valve stem extending in said central aperture and said outlet, said lower collar engageable with said cap around said outlet to seat thereon, and said upper collar engageable with the inner portion of said flange to seat thereon.

* * * * *